(No Model.)

W. C. PEYTON.
PROCESS OF AND APPARATUS FOR MAKING GUNPOWDER.

No. 544,517. Patented Aug. 13, 1895.

Witnesses,

Inventor,
William C. Peyton
By Dewey & Co
Attys

UNITED STATES PATENT OFFICE.

WILLIAM C. PEYTON, OF SANTA CRUZ, ASSIGNOR TO THE CALIFORNIA POWDER WORKS, OF SAN FRANCISCO, CALIFORNIA.

PROCESS OF AND APPARATUS FOR MAKING GUNPOWDER.

SPECIFICATION forming part of Letters Patent No. 544,517, dated August 13, 1895.

Application filed May 28, 1894. Serial No. 512,783. (No model.)

*To all whom it may concern:*

Be it known that I, WILLIAM C. PEYTON, a citizen of the United States, residing at Santa Cruz, Santa Cruz county, State of California, have invented an Improvement in the Manufacture of Gunpowder; and I hereby declare the following to be a full, clear, and exact description of the same.

My invention relates to the treatment of explosives which at a certain stage of the manufacture are in a plastic or semiplastic condition. Types of such explosives are the gelatinated mixtures made by the action of solvents upon certain nitro compounds or organic nitrates with which other substances may or may not be incorporated, the result being a plastic or semiplastic mass. The plastic condition may also be produced in other ways. The object of my invention is to convert this mass into grains or pellets suitable for use in shotguns, small-arms, or in cannon.

In my process the mass is first formed into a cylindrical tube or pipe, which is afterward opened out into the form of a sheet, and is then passed between grooved rollers, which serve the double object of consolidating it and of pressing it into strips adherent at their edges by very slight films, so that the whole may be still handled as a continuous sheet until granulated.

In describing my invention I refer to the accompanying drawings, in which—

Figure 1:
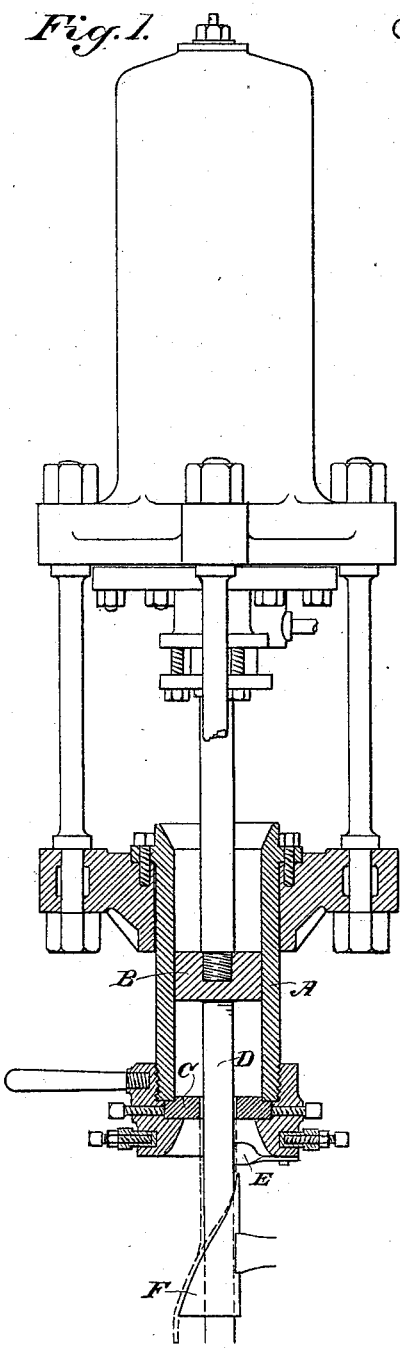
Figure 2:
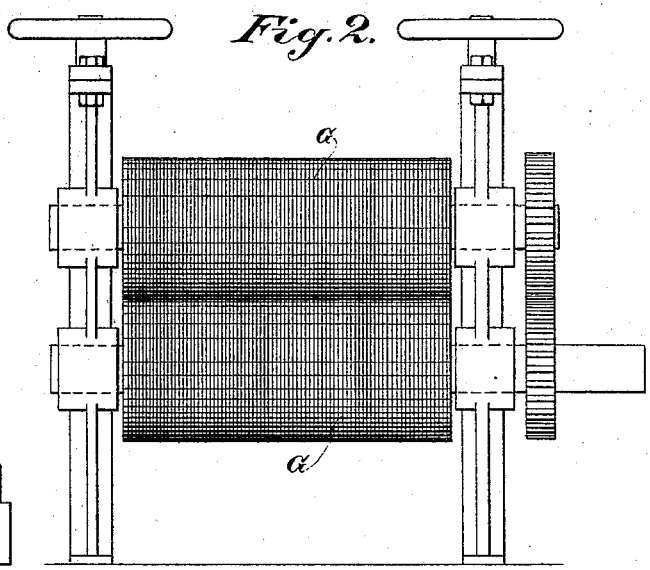
Figure 4:
Figure 3:
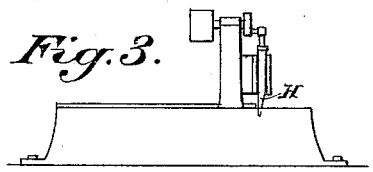
Figure 5:
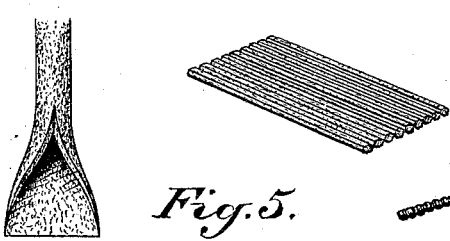

Figure 1 is a view of the first portion of the apparatus employed. Fig. 2 is a view of the second portion. Fig. 3 is a view of the third portion. Fig. 4 is an enlarged view of the meeting faces of the rollers. Fig. 5 shows the plastic material in its different stages.

In the first portion of my process I employ a powerful press, Fig. 1, of suitable form, actuated by hydraulic or other power, having a cylinder A, into which the plastic mass, when properly prepared, is introduced. The plunger or follower B is then moved down through the cylinder by operating the press, and the mass is forced through a circular die C at the bottom and around the central rod or mandrel D. By this first operation the mass is forced through the hole around the mandrel, passing out in the form of a homogeneous tube or hollow cylinder. At or about the point where this tube leaves the die I place a knife or cutter E and diverging guides F. The cutter splits the tube upon one side and the diverging guides separate the edges and spread the tube out into a flat sheet of considerable width. The advantage of this tubular formation of the material is that it is forced evenly through the hole, there being an equal distribution of pressure around the mandrel, and when the tube has been cut and opened out to form a sheet the edges of this sheet are in all respects homogeneous and similar to the interior portions. In a sheet or ribbon made by pressing the material through a slot the greater friction at the ends of the slot will make the ribbon defective along the edges. It will also be liable to buckle on account of unequal speed in its different parts, the center moving faster than the sides. From this part of the apparatus the sheet is conveyed to the set of rollers G, Fig. 2, which form the second portion of my apparatus.

The rollers G are formed with a series of alternate transverse grooves and ridges, the diameter of the grooves being equal to that desired for the grains of powder. These grooves may be made of any suitable or desired form. I have found that a semihexagonal form of groove in each of the rollers, the ridges of one roller traveling in close proximity to those of the other, will give a very suitable cross-section for the strips, this being hexagonal, while the ridge forms a strong cutting-edge having an angle of sixty degrees. The sheet being passed between these rollers is pressed into hexagonal strips united by the slight film of material which remains between the edges of the ridges, so that the sheet, while practically separated into a great number of hexagonal strips, is still held together by these films as a single sheet, which is easy to handle. From this apparatus the sheet passes beneath a vertically-reciprocating cutter H, having an adjustable feed, Fig. 3, by which the strips are cut into short lengths. I prefer to cut the grains so that their length is about equal to their thickness. During the operation of cutting them most of the grains will be separated from their fellows. To complete the separation they may be rubbed on a sieve of suitable mesh or rolled in a barrel or otherwise separated by any suitable apparatus.

It is manifest that the grains may be made of any desired cross-section by changing the shape of the grooves in the rollers.

By the use of this apparatus I obtain several advantages: First, the hole in the preliminary press being central, the pressure and friction are equalized and a sheet is formed which has no tendency to buckle; second, by making the sheet first in a tubular form I am enabled from the same cylinder to get a larger sheet or ribbon than could be obtained by pressing it through a slot, and the edges of the sheet are also smooth and perfect after it has been cut through at one side; third, by using the grooved rollers described above I press the sheet into parallel strips of uniform cross-section and great density, which still retain the sheet form and are very convenient to handle in the subsequent operation of granulation.

Having thus described my invention, what I claim as new, and desire to secure by Letters Patent, is—

1. In the manufacture of gunpowder which is plastic at a certain stage, the process of forming the plastic mass into a tube, cutting this through one side parallel with the axis, opening the tube into a flat sheet and passing it between grooved rollers whereby the sheet is formed into numerous parallel strips having a geometrical cross section, with uniting intermediate films.

2. The process of manufacturing gunpowder consisting in first forcing the plastic material through a central hole around a rod or mandrel whereby it is formed into a tube, then cutting the tube open along one side parallel with the axis, and separating the edges to form the cylinder into a flat sheet, then passing the sheet thus formed between grooved rollers, whereby the sheet is formed into parallel strips of geometrical cross section with intermediate uniting films, and finally passing it beneath a vertically reciprocating cutter whereby the strips are cut into grains.

3. An apparatus for forming plastic material into sheets, consisting of a cylinder adapted to receive the material which is forced through it by pressure, a die at the opposite end of the cylinder with a central hole, a mandrel passing through the center of said hole leaving an annular channel around it through which the material is forced so as to form a tube or pipe, and a fixed cutter adapted to cut through one side of said tube after it leaves the dies, and diverging guides by which the cut edges are separated and the tube formed into a flattened sheet.

In witness whereof I have hereunto set my hand.

WILLIAM C. PEYTON.

Witnesses:
T. V. MATHEWS,
JOHN R. CLEARY.